April 26, 1932.  W. H. NICHOLLS  1,855,409
MOLDING MACHINE
Filed June 3, 1930    5 Sheets-Sheet 1

Fig. 1.

INVENTOR
WILLIAM H. NICHOLLS
BY
ATTORNEYS

April 26, 1932. W. H. NICHOLLS 1,855,409
MOLDING MACHINE
Filed June 3, 1930 5 Sheets-Sheet 5

INVENTOR
WILLIAM H. NICHOLLS
BY
ATTORNEYS

Patented Apr. 26, 1932

1,855,409

UNITED STATES PATENT OFFICE

WILLIAM H. NICHOLLS, OF OLD WESTBURY, NEW YORK

MOLDING MACHINE

Application filed June 3, 1930. Serial No. 459,080.

This invention relates to a type of molding machine which performs a mold forming operation of one character with the mold flask and pattern plate in one position and then rolls over said flask and plate about a horizontal axis to another position for the performance of a mold forming operation of a different character. Such a molding machine is known to the trade as a "roll-over" machine.

Important objects of the present invention are, to provide a roll-over molding machine of generally improved design; to provide improved means for effecting the roll-over; to provide improved means for effecting the roll-over and also the mold forming operations by fluid pressure; to provide improved valve means for controlling the fluid pressure operated roll-over means and mold forming means; to provide a roll-over machine capable of performing the operations of jolting, squeezing and pattern drawing in an efficient manner; to provide means whereby the roll-over carrier for the flask and pattern plate will be enabled to serve as a pressure head during the squeezing operation; to provide satisfactory locking means for holding the pattern plate to said carrier during the roll-over and roll-back movements of the carrier; to provide for the automatic operation of said locking means, to release the pattern plate from the carrier for the jolting operation and lock it to the carrier for the roll-over; to provide improved means for holding the flask to the pattern plate during the roll-over and for automatically releasing the flask from the pattern plate for the pattern drawing operation; and to provide other improved features which will appear hereinafter.

The structure of the machine includes a main body casting forming a flat, elongated base 1, a vertical jolt cylinder 2 at one end of the base, a vertical squeeze cylinder 3 at the opposite end of the base and a dome-like central casing 4 located between said cylinders and forming an enclosure for part of the roll-over mechanism. Said cylinders and casing are cast integrally with the base and form part of pneumatically operated means for performing the jolting, mold squeezing and pattern drawing operations. The jolt cylinder 2 is materially smaller in diameter than the squeeze cylinder 3 and both cylinders are closed at the bottom and open at the top. Fitted in the jolt cylinder for reciprocation is a jolt piston 5 in the form of an elongated hollow casting. At its upper end said piston casting is integrally formed with a wide, flat head 6 having a shoulder 7 at its under side normally resting upon the upper end of the cylinder. A squeeze piston 8 is fitted to reciprocate in the squeeze cylinder 3 and is in the form of a hollow cylindrical casting closed at its lower end and open at its upper end. In its lowermost position the squeeze piston rests upon the bottom of its cylinder while its upper end projects above the cylinder and has a flat squeeze head 9 bolted upon it. Head 9 has several depending guide rods 10 fixed to it and fitted to slide in tubular guides 11 integrally formed upon the outer sides of the cylinder. Said rods prevent the squeeze piston and its head from turning and are provided with heads at their lower ends for contact with stop shoulders within the guides 11 to limit the upward movement of the piston. Similarly the jolt head 6 is provided with fixed depending rods 12 which are slidably fitted in tubular guides 13 integrally formed upon the outer sides of the jolt piston and prevent the said piston and its head from turning.

A roll-over mechanism is provided for rolling a mold flask and pattern plate from a position over the jolt head to a position over the squeeze head and, after the performance of the squeezing and pattern drawing operations, rolling the pattern plate back to a position over the jolt head. This mechanism includes a pivoted carrier 14 comprising a casting in the form of a substantially L-shaped open frame having a normally vertical portion and a normally horizontal portion which forms a support for a pattern plate holding plate 15, a pattern plate 15$^a$ and a mold flask 16. At one end said vertical portion of the carrier is formed with laterally extending ears 17 which straddle the upper end of the dome-like central casing 4 and are keyed upon a shaft 18 which extends horizontally through the casing and is rotatably mounted in bearings 19 formed with the casing.

Within the casing are pneumatically operated means for rotating said shaft and swinging the carrier about a horizontal axis. Said means includes a vertical cylinder 20 located within the lower end of casing 4 and formed with flanges 21 at opposite sides which are bolted to the under sides of flanges 22 formed upon the casing, the lower end of the casing being open to permit this mounting of the cylinder. The lower end of the cylinder is closed by an integral wall and its upper end is closed by a detachably mounted cylinder head 23 provided with a stuffing box. A piston 24 is fitted to reciprocate in the cylinder and has a piston rod 25 extending upward through said stuffing box. Between the piston rod and the shaft 18 there is a chain and sprocket operative connection. A double sprocket wheel 26 is keyed to the shaft and a similar wheel 27 is keyed to a shaft 28 parallel to shaft 18 suitably spaced below it and rotatably supported by bearings 29 formed upon the casing 4. Trained around said sprocket wheels are two endless chains 30. At its upper end the piston rod is formed with an enlarged head 31 which extends between said chains and is operatively connected to them as indicated at 32. Thereby when the piston is reciprocated by air pressure the shaft 18 will be rotated and the carrier will be swung to move its load back and forth over its horizontal axis, between jolting position and squeezing position. In order to cushion the descent of the carrier and its load to squeezing position the cylinder is provided with an exterior by-pass connection 33 connecting two vertically spaced ports 34 and 35 in the cylinder, and provided with a downwardly opening check valve 33$^a$. When the center of gravity of the carrier and its load passes the vertical dead center the piston is in a position to uncover port 34 and permit air to flow through the by-pass and port 35 to the under side of the piston to resist the descent of the latter and also that of the carrier. Similarly the descent of the carrier to jolting position is cushioned by an exterior by-pass 36 connecting two vertically spaced cylinder ports 37 and 38 and provided with an upwardly opening check valve 36$^a$. When the carrier passes the vertical dead center in its roll-back movement to jolt position the piston is in a position to uncover the port 37 and permit a flow of air from the under side of the piston to the upper side.

The pattern plate support 15 is releasably held to the carrier 14 at one face of the horizontal portion thereof by locking means including four vertical headed pins 39 fixed to the plate and extending through and beyond apertures 40 in the carrier. At opposite sides the carrier bears two slidable locking bars 41 each formed with two retaining hooks 42 for embracing the shanks and engaging the heads of two of the pins 39 and preventing their shifting through the apertures. Each of said locking bars is slidably held to the carrier by a pair of headed screws 43 which are passed through slots 44 formed in the bar. During the roll-over and roll-back movements of the carrier and while it is in squeezing and pattern drawing position the bars 41 are held in locking position. When the carrier and pattern plate approach jolting position the bars are automatically shifted to unlocking position and when the carrier and pattern plate move away from jolting position the bars are automatically returned to locking position. The automatic shifting means includes a cam plate 45 fixed to one side of the central casing 4 and encircling the shaft 18. Said cam plate is formed in its outer face with a cam groove 46 having a major portion concentric with the shaft and a lower eccentric portion 46$^a$. A lever 47 is pivotally mounted intermediate its ends upon the carrier, at a point adjacent the cam, and bears a roller at one end engaging in the cam groove. The opposite end of the lever is pivotally connected to one end of a link 48 whose opposite end is in turn pivotally connected to a crank arm 49 fixed to a rock shaft 50. This shaft extends horizontally across the carrier and is rotatably supported in bearings 51 at the bend of the carrier. Near its opposite ends said shaft bears two crank arms 52 fixed to it and pivotally connected to the inner ends of the locking bars 41 for operating them.

When the carrier and pattern plate approach the jolting position the roller of the lever 47 enters the portion 46ª of the cam groove and is rocked to cause the shifting of the locking bars 41 to release position. Thereby the pattern plate support 15 is freed from the carrier for the jolt operation. The open frame-like form of the carrier provides clearance for the jolt head and permits the latter to project therethrough into contact with the pattern plate support for supporting it. When the carrier is rotated to move the pattern plate and a supported mold flask 16 away from jolt position the roller of the lever 47 is cammed into the concentric portion of the cam groove and the lever and connected parts are operated to shift the locking bars 41 to locking position.

The pattern plate support 15 is formed at its outer face with undercut slots 53 and the pattern plate 15ª is detachably clamped to the support by bolts 54 having heads which engage in said slots. One or more patterns P are secured to the pattern plate and the mold flask 15 rests upon the pattern plate and surrounds the pattern. To hold the flask properly positioned upon the pattern plate the latter is provided with pins 55 which extend through apertures ears 56 formed upon opposite sides of the flask. The flask is open at top and bottom and before the roll over from jolting position is commenced a presser board 57 is fitted in the top of the flask to bear against the sand.

In order to hold the flask against the pattern plate during the roll-over it is releasably clamped in place. At its opposite sides the vertical portion of the carrier 14 supports two vertical rods 58 upon which are pivoted two clamp bearing arms 59. Each arm has a hub 60 rotatably and slidably mounted upon its rod 58 between two collars 61. The latter are adjustable along the rod to properly position the arm and are adapted to be clamped to the rod. The hub of each arm is recessed to receive a torsion spring 62 which is anchored to the hub and to the adjacent collar 61 and tends to swing the arm outward. At their free ends the arms bear manually operable clamps 63. Before the roll-over is commenced the clamp bearing arms are swung inward and the clamps 63 are operated to bear upon the presser board 57 and thereby hold the flask to the pattern plate.

Figure 1:
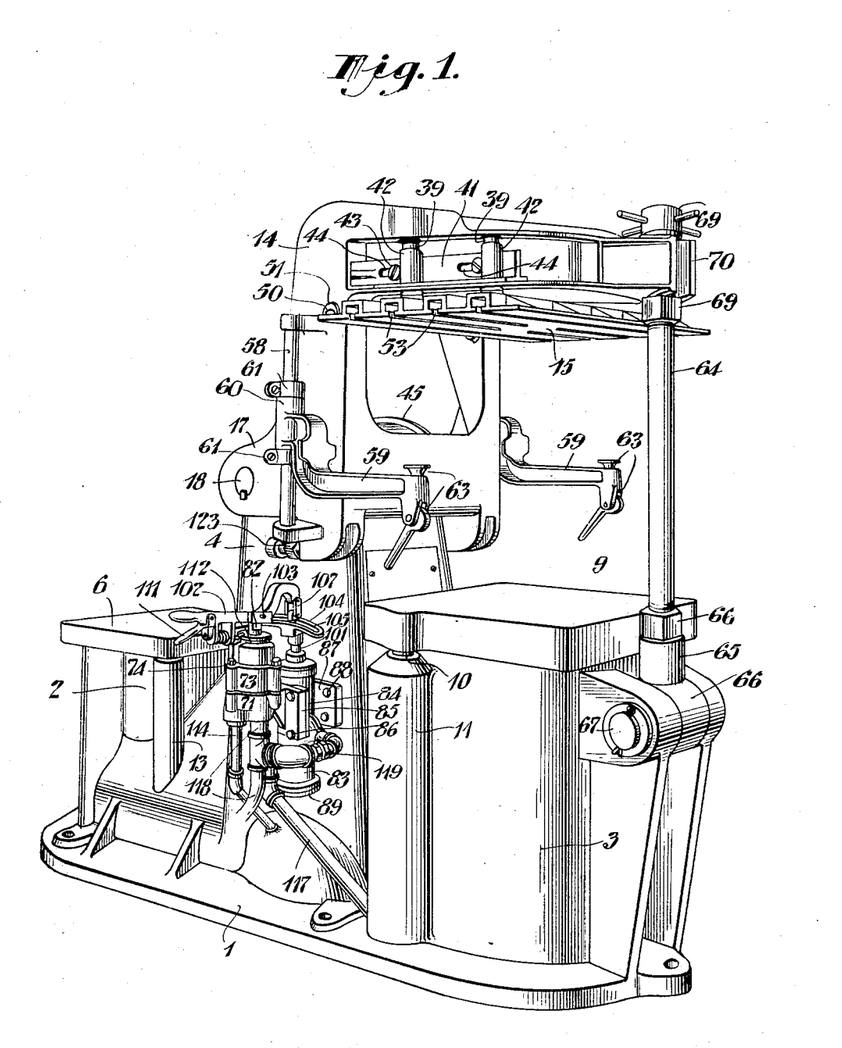
Fig. 1 is a perspective view of the molding machine.
Figures 2, 3:
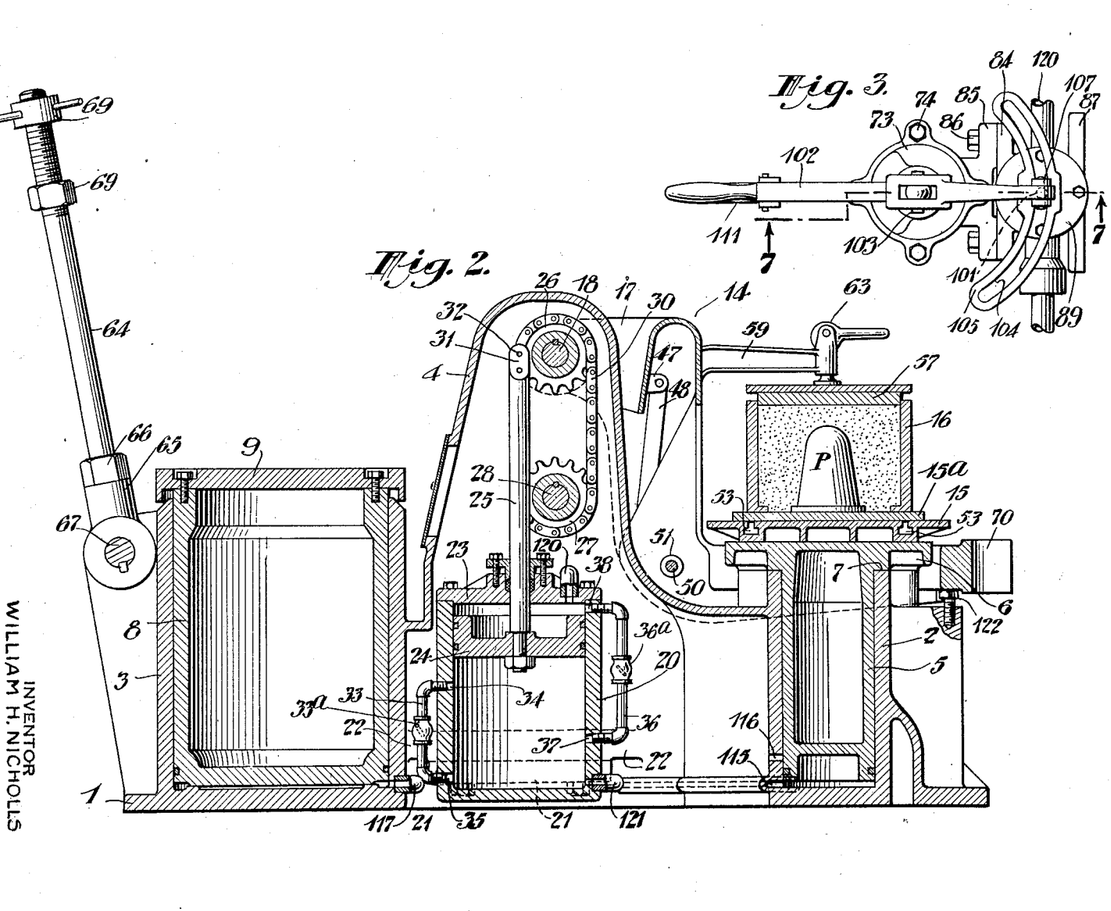
Fig. 2 a vertical longitudinal section taken through the center of the machine and showing a mold flask and pattern supported in jolting position.
Fig. 3 a plan view of the valve device for controlling the operations of the jolting and squeezing mechanisms and the roll-over mechanism.
Figures 4, 5:
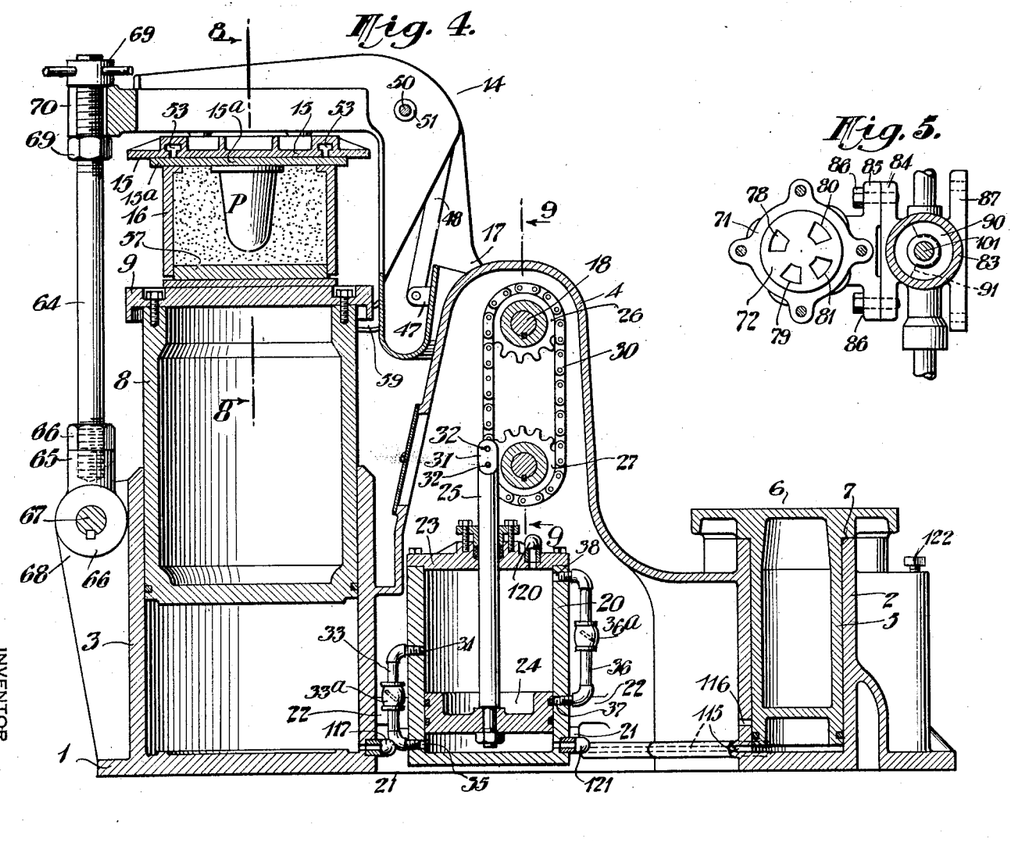
Fig. 4 a view similar to Fig. 2 showing the machine performing a mold squeezing operation.
Fig. 5 a section taken through the valve device on the line 5—5 of Fig. 7.

When the carrier 14 is in position to dispose the flask over the squeeze head 9, as shown in Fig. 4, the carrier forms the upper squeeze head of the machine. To hold the carrier in place and resist the upward squeeze thrust it is releasably anchored to the main casting by a rod 64. One end of said rod is screwed into a socket-member 65 and held by a check nut 66. The socket member is formed with an eye or hub 66 which is fixed upon a pin 67 and between ears 68 formed upon one side of the squeeze piston and rotatably supporting said pin. At its free end the rod has two nuts 69 screwed upon it in spaced positions and, between said nuts, the rod is adapted to engage in a fork 70 formed in the outer end of the carrier 14. One of the nuts 69 is adapted to bear against the upper surface of fork 70 and anchor the rod to the carrier. When the carrier is to be rotated back to jolting position the rod 64 is swung free from the fork 70.

The operations of jolting, rolling over, squeezing, drawing and rolling back are all performed by the pneumatically operated mechanisms described. For controlling the operations of said mechanisms a pair of valve devices are provided including a rotary valve for controlling the mold forming operations and a reciprocating valve for controlling the roll-over and roll-back operations. Both of these valves are conveniently operated by a single handle. The rotary valve device includes a valve casing comprising a lower section or base 71 forming the valve seat 72 and a hollow upper section or cap 73 bolted to the lower section as at 74. Within the cap is a rotary valve disk 75 bearing upon the seat 72. At its under side valve 75 is formed with two port cavities 76 and 77 for cooperation with four ports 78, 79, 80 and 81 formed in the valve seat. A vertical operating stem 82 is keyed to the valve and extends upward through a bearing in the cap 73.

The reciprocating valve device is disposed just to the rear of the rotary valve device and its structure includes a vertically disposed cylindrical valve casing 83. This casing is formed with bracket flanges 84 which abut similar flanges 85 formed upon the base 71 of the rotary valve casing and are bolted to them as at 86. At its rear side the casing 83 is formed with bracket flanges 87 which are bolted to the casing 4 as at 88. Cylinder heads 89 are bolted to the ends of casing 83. Within said casing a cylindrical valve 90 is fitted to reciprocate vertically. Near its upper and lower ends valve 90 is formed with peripheral port grooves 91 and 92 respectively and between said ports the valve is formed with peripheral port grooves 93 and 94. The valve casing is formed with ports 95, 96, and 97 at one level for cooperation with valve grooves 91 and 93, and with ports 98, 99 and 100 for cooperation with valve grooves 92 and 94, as will be described hereinafter. An operating stem 101 is fixed to the valve and extends upward through a guide bearing in the upper cylinder head.

Both valves 75 and 90 are operated by a handle or lever 102 which is pivotally attached intermediate its ends to the upper end of the rotary valve stem as at 103, for swinging in a horizontal plane to rotate valve 75 and for rocking vertically to operate valve 90. There is an operative connection between the rear end of the lever and the stem 101 of valve 90 which permits the lever to be rotated horizontally for the operation of valve 75 without breaking said connection. An arcuate segment 104 is attached to the upper end of valve stem 101 and has an arcuate slot 105 concentric with the axis of the rotary valve stem 82. A block 106 is mounted to slide along said slot and held against withdrawal. Between the rear end of the lever and said block is a pivoted link connection 107. A latch pin 108 is carried by the lever 102 beneath its forward arm and a spring 109 tends to press said pin inward into engagement with a keeper hole or socket 110 formed in the casing of the rotary valve, for holding the lever and both valves in a normal position. A releasing handle 111 is connected to the forward end of the latch pin and disposed directly beneath a grip for operating the lever. The casing of the rotary valve is formed with a guard groove 112 extending horizontally around the bearing of the valve stem and forming a guide for the latch pin as the lever is swung horizontally for the operation of the rotary valve. Thereby the lever is held horizontal and undesired operation of the reciprocating valve is prevented. The groove 112 is, however intersected by a vertical groove or notch 113 located directly in front of the keeper socket 110 so that when the lever is released at normal position it may be rocked vertically for the operation of the valve 90, the notch 113 providing clearance for the latch pin.

A pipe 114 leads from port 78 of the rotary valve seat 72 to a cored out passage 115 formed within the main casting of the machine and leading to the lower end of the jolt cylinder 2. Spaced suitably a short distance above the lower end of the jolt cylinder is a jolt exhaust port 116. Another pipe 117 leads from port 81 of the valve seat to the lower end of the squeeze cylinder 3 for the supply and exhaust of air therefrom. Port 80 adjacent port 81 is a squeeze exhaust port and opens to atmosphere while port 79 is an inlet port through which air is admitted for both jolting and squeezing. Connected to port 79 is a supply pipe 118 which leads from a source of air pressure, not shown.

Figures 6, 7, 7A:
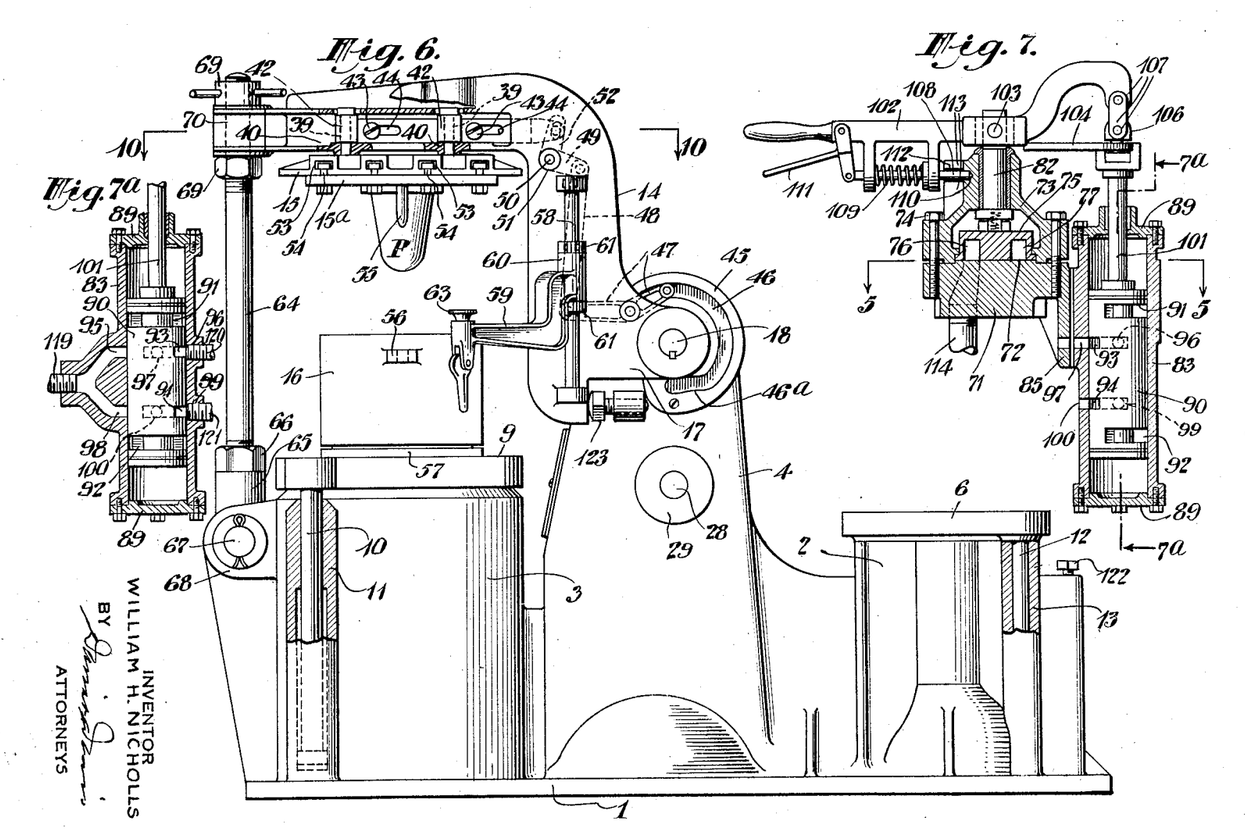
Fig. 6 a side view of the machine partly in section and showing the completion of a pattern drawing operation.
Fig. 7 a sectional view of the valve device taken on the line 7—7 of Fig. 3.
Fig. 7a a section taken on the line 7a—7a of Fig. 7.
Figure 8:
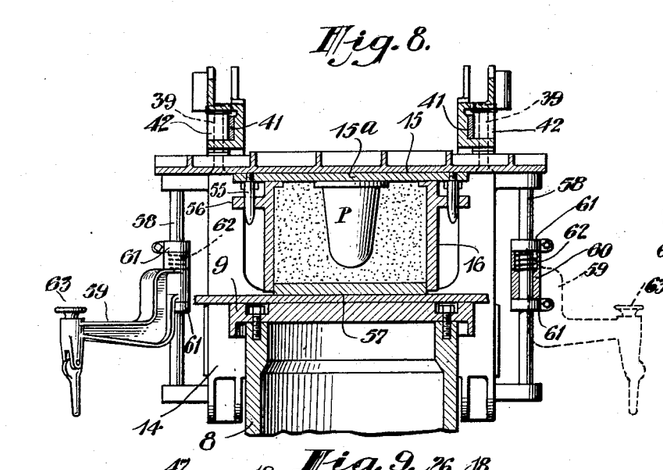
Fig. 8 a section taken on the line 8—8 of Fig. 4.
Figure 9:
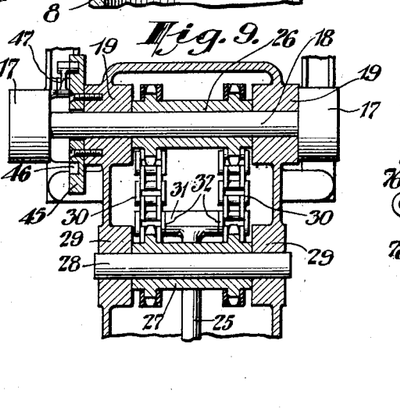
Fig. 9 a section taken on the line 9—9 of Fig. 4.
Figure 10:
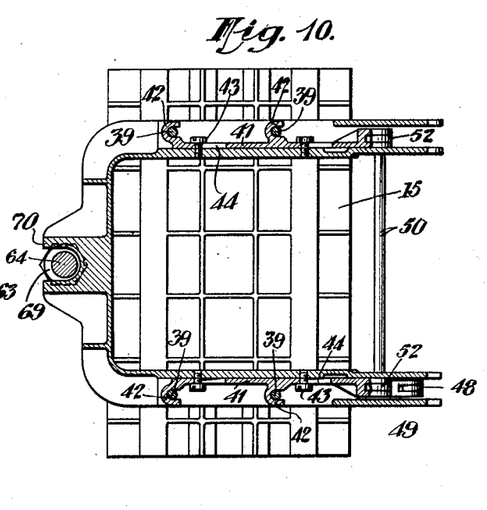
Fig. 10 a section taken on the line 10—10 of Fig. 6.

A branch 119 leads from the supply pipe 118 to the casing 83 of the reciprocating valve and is connected to the two ports 95 and 98 as shown in Fig. 7ª. A pipe 120 leads from port 96 of said valve casing to the upper end of the roll-over cylinder 20 and another pipe 121 leads from port 99 to the lower end of said cylinder.

Figure 11:
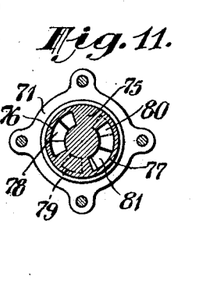
Figs. 11, 12 and 13 horizontal sectional views showing different adjustments of the rotary valve.

When the valve operating handle 102 is in normal latched position, the rotary valve, as shown in Fig. 11, has its cavity 77 in position to connect the squeeze port 81 with the exhaust port 80, so that the squeeze cylinder is vented to atmosphere. The jolt port 78 opens only into cavity 76 which is disconnected from the supply port 79. At the same time the reciprocating valve 90 is in mid position so that the upper end of the roll-over cylinder is vented through pipe 120 and ports 93 and 97 and the lower end of said cylinder is vented through pipe 121 and ports 94 and 100.

Figure 12:
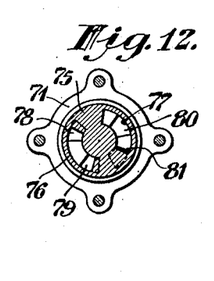

In the operation of the machine it will be assumed first that the carrier 14, flask and pattern plate are in jolting position with the pattern plate support 15 released from the carrier and resting upon the jolt head 6. The flask is then filled with sand and the handle 102 is unlatched and swung to rotate valve 75 to the position shown in Fig. 12. Cavity 76 then connects supply port 79 with jolt port 78 for the admission of air to the lower end of the jolt cylinder, for jolting in the usual manner. The carrier is supported when in jolt position by an adjustable stop 122 screwed into an extension of the main casting. When the sand has been jolted sufficiently the valve handle is brought back to normal position and latched. Lateral movement of the valve handle to jolt and squeeze positions is limited by the ends of the slot 104. Then the presser board 57 is applied to the flask and the clamps 63 are engaged with the presser board to hold the flask in place. The valve handle is then unlatched and swung vertically to depress valve 90 and move port 91 into position to connect supply port 95 with pipe 120 and the upper end of the roll-over cylinder 20. Thereby the piston 24 is depressed and the carrier 14 is rotated to roll the flask and pattern plate over the axis of shaft 18 to squeezing position. Adjustable stops 123 mounted upon opposite sides of the casing 4 stop the carrier in squeezing position. The valve handle is then moved to normal position and valve 90 vents both ends of the roll-over cylinder to atmosphere.

Figure 13:
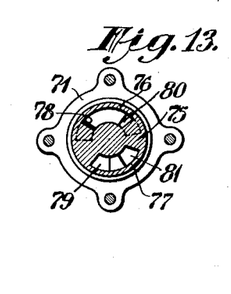

For the squeezing operation the tie rod 64 is swung upward into the fork 70 of the carrier with the lower nut 69 engaging the under side of the fork, and the upper nut 69 is screwed down upon the upper side of the fork. Thereby the carrier is firmly held for the squeeze. The valve handle is swung horizontally to rotate valve 75 to the position shown in Fig. 13. Valve cavity 77 then connects air supply port 79 with squeeze port 81 to admit air to the lower end of squeeze cylinder 3 so that the squeeze head is forced upward against the presser board 57 to compress the sand in the flask. Upward movement of the presser board releases the clamps 63 which are then swung outward by the springs. When the squeeze is completed the valve handle is swung back to normal position, positioning valve 75 as shown in Fig. 11 for the exhaust of air from the squeeze piston through ports 81, 77 and 80. Thereupon the squeeze piston lowers by gravity and the flask, freed from the carrier by the release of the clamps, rests upon the squeeze head 9 and follows it downward while the pattern plate remains locked to the carrier. Thereby the mold is drawn from the patterns.

The roll-back of the carrier and its supported pattern plate is accomplished by swinging the valve handle 102 vertically to raise the valve 90 so that its port 92 connects supply port 98 to pipe 121 leading to the lower end of the roll-over cylinder 20. Thereby the piston 24 is moved upward and the carrier and pattern flask are swung back to jolt position, the pattern plate support 15 being automatically unlocked from the carrier as it approaches jolt position, as previously described. When jolt position is reached the valve handle is swung to normal position and latched. The pattern plate is then ready to receive another flask. Descent of the carrier and its load to jolt position and to squeeze position is cushioned by flow of air through the by-pass means, as previously described.

What I claim is:

1. A molding machine comprising a carrier for a pattern plate and a mold flask; a mounting for said carrier supporting it for rotation about a horizontal axis; a jolting mechanism at one side of said axis; a mold squeezing mechanism at the opposite side of the axis; and means to rotate said carrier to roll the flask and pattern plate over from a position in operative relation to said jolting mechanism to a position in operative relation to said squeezing mechanism and roll the pattern plate back to said first position.

2. A molding machine comprising a carrier for a pattern plate and a mold flask; a mounting for said carrier supporting it for rotation about a horizontal axis; a jolting mechanism at one side of said axis; a vertically reciprocable mold squeezing means at the opposite side of the axis; means to rotate said carrier to roll the flask and pattern plate over from a position in operative relation to said jolting mechanism to a position in operative relation to the squeezing means, the carrier in the latter position forming an upper pressure head, with the flask and pattern plate disposed between said head and the squeezing means for the squeezing operation; and means for releasably locking the carrier in position to resist the upward thrust of the squeezing means.

3. A molding machine comprising a carrier for a pattern and a mold flask; a mounting for said carrier supporting it for rotation about a horizontal axis; a jolting mechanism at one side of said axis; a mold squeezing mechanism at the opposite side of the axis; chain and sprocket means for rotating said carrier; and pneumatically operated means operatively connected to said chain and sprocket means to rotate the carrier to roll the flask and pattern plate over from a position in operative relation to said jolting mechanism to a position in operative relation to the squeezing mechanism for squeezing and roll the pattern back to said first position.

4. A molding machine comprising a carrier for a pattern and a mold flask; a mounting for said carrier supporting it for rotation about a horizontal axis; a jolting mechanism at one side of said axis; a mold squeezing mechanism at the opposite side of the axis; chain and sprocket means for rotating said carrier; and pneumatically operated means operatively connected to said chain and sprocket means to rotate the carrier to roll the flask and pattern plate over from a position in operative relation to said jolting mechanism to a position in operative relation to the squeezing mechanism for squeezing and roll the pattern back to said first position, the carrier in squeezing position forming an upper pressure head, with the flask and pattern disposed between said head and the squeezing means.

5. A molding machine comprising a carrier for a pattern and a mold flask; a mounting for said carrier supporting it for rotation about a horizontal axis; a jolting mechanism at one side of said axis; a mold squeezing mechanism at the opposite side of the axis; chain and sprocket means for rotating said carrier; pneumatically operated means operatively connected to said chain and sprocket means to rotate the carrier to roll the flask and pattern plate over from a position in operative relation to said jolting mechanism to a position in operative relation to the squeezing mechanism for squeezing and roll the pattern back to said first position; the carrier in squeezing position forming an upper pressure head, with the flask and pattern disposed between said head and the squeezing means; and locking means for releasably locking the carrier in position to resist the upward thrust of the squeezing means.

6. A molding machine comprising a carrier for a pattern and a mold flask; a mounting for said carrier supporting it for rotation about a horizontal axis; a jolting mechanism at one side of said axis; a mold squeezing mechanism at the opposite side of the axis; and pneumatically operated means to rotate said carrier to roll the flask and pattern over the axis from a position in operative relation to said jolting mechanism to a position in operative relation to said squeezing mechanism.

7. A molding machine comprising a carrier for a pattern plate and a mold flask; a mounting for said carrier supporting it for rotation about a horizontal axis; a jolting mechanism at one side of said axis; a vertically reciprocable mold squeezing means at the opposite side of the axis; means to rotate said carrier to roll the flask and pattern plate over from a position in operative relation to said jolting mechanism to a position over said squeezing means for squeezing, the carrier in the latter position forming an upper pressure head opposing the squeezing means; means holding the pattern plate to the under side of said pressure head; and releasable means to hold the flask to the under side of the pattern plate, said latter means being releasable to free the flask from the pattern plate and permit the flask to rest upon the squeezing means and move downward with it to draw the pattern from the mold after the squeezing operation.

8. A molding machine comprising a carrier for a pattern plate and a mold flask; a mounting for said carrier supporting it for rotation about a horizontal axis; a jolting mechanism at one side of said axis; a vertically reciprocable mold squeezing means at the opposite side of the axis; means to rotate said carrier to roll the flask and pattern plate over from a position in operative relation to said jolting mechanism to a position over said squeezing means for squeezing, the carrier in the latter position forming an upper pressure head opposing the squeezing means; means holding the pattern plate to the under side of said pressure head; and releasable means to hold the flask to the under side of the pattern plate, said latter means being automatically released by the squeezing operation to free the flask from the pattern plate and permit the flask to rest upon and follow the squeezing means downward to draw the pattern from the mold.

9. A molding machine comprising a carrier for a pattern and a mold flask; a mounting for said carrier supporting it for rotation about a horizontal axis; a jolting mechanism at one side of said axis; a mold squeezing mechanism at the opposite side of the axis; fluid pressure operated means to rotate said carrier to roll the flask and pattern over the axis from a position in operative relation to the jolting mechanism to a position in operative relation to the squeezing mechanism and roll the pattern back over the axis to said first position; and means to cushion the descent of the carrier to said positions by fluid pressure.

10. A molding machine comprising a carrier for a pattern and a mold flask; a mounting for said carrier supporting it for rotation about a horizontal axis; a jolting mechanism at one side of the axis; a mold squeezing mechanism at the opposite side of the axis; a fluid pressure operated mechanism for rotating the carrier, comprising a cylinder, a piston in said cylinder, fluid connections leading to the cylinder for causing the piston to reciprocate, and an operative connection between the piston and the carrier to rotate it to roll the flask and pattern over the axis from a position in operative relation to the jolting mechanism to a position in operative relation to the squeezing means when the piston is moved in one direction and rolling the pattern back over the axis to said first position when the piston is moved in the opposite direction; and by-pass means to conduct fluid past said piston from one point in the cylinder to another for resisting the movement of the piston and cushioning the descent of the carrier and its load to said jolting and squeezing positions.

11. A molding machine comprising a carrier for a pattern and a mold flask; a mounting for said carrier supporting it for rotation about a horizontal axis; a pneumatically operated jolting mechanism at one side of said axis; a pneumatically operated mold squeezing and pattern drawing mechanism at the opposite side of the axis; and a pneumatically operated mechanism to rotate said carriers to roll the flask and pattern over the axis from a position in operative relation to said jolting mechanism to a position in operative relation to said squeezing and pattern drawing mechanism and roll the pattern back to said first position.

12. A molding machine comprising a carrier for a pattern and a mold flask; a mounting for said carrier supporting it for rotation about a horizontal axis; a pneumatically operated jolting mechanism at one side of said axis; a pneumatically operated mold squeezing and pattern drawing mechanism at the opposite side of the axis; a pneumatically operated mechanism to rotate said carrier to roll the flask and pattern over the axis from a position in operative relation to said jolting mechanism to a position in operative relation to said squeezing and pattern drawing mechanism and roll the pattern back to said first position; valve means to control the operation of said jolting, squeezing, drawing and carrier rotating mechanisms; and a handle for operating said valve means, said handle being shiftable in one plane to control the operation of the jolting and squeezing and pattern drawing mechanisms and shiftable in another plane to control the operation of the carrier rotating mechanism.

13. A molding machine comprising a body casting forming a vertical jolt cylinder; a vertical squeeze cylinder laterally displaced from the jolt cylinder, and a casing between said cylinders and integrally cast with them; pneumatically operated jolting means mounted to reciprocate in said jolt cylinder; pneumatically operated mold squeezing means mounted to reciprocate in said squeeze cylinder; a carrier for a pattern and mold flask supported by said intermediate casing for rotation about a horizontal axis; and a mechanism within said casing for rotating said carrier to roll the pattern and flask from a position in operative relation to the jolting means to a position in operative relation to the squeezing means and roll the pattern back to said first position.

14. A molding machine comprising a body casting forming a jolt cylinder and a squeeze cylinder laterally displaced from said jolt cylinder and integrally cast with it; jolting means mounted to reciprocate in said jolt cylinder; mold squeezing means mounted to reciprocate in said squeeze cylinder; and a carrier for a pattern and flask supported by said body for rotation to roll the flask and pattern from a position in operative relation to said jolting means to a position in operative relation to said squeezing means.

15. A molding machine comprising a carrier arm for a pattern and a mold flask; a mounting for said arm supporting it for rotation about a horizontal axis; a jolting mechanism at one side of the axis; a vertically reciprocable mold squeezing means at the opposite side of said axis; means to rotate the carrier arm to roll the pattern and flask over the axis from a position in operative relation to said jolting means to a position in operative relation to said squeezing means, the carrier arm in the latter position forming an upper pressure head with the pattern and flask disposed between said head and the squeezing means; and a shiftably supported tie rod to releasably anchor to the free end of the carrier arm and resist upward squeezing thrust upon the arm.

16. A molding machine comprising a base, mold squeezing mechanism carried by said base and including a vertically reciprocable squeezing member; a carrier for a pattern and mold flask mounted upon the base for rotation about a horizontal axis to roll the flask and pattern over to and from opposed cooperative relation to said squeezing member, the carrier forming an upper pressure receiving head for squeezing; and releasable locking means to hold the carrier for resisting the thrust of the mold squeezing mechanism.

17. A molding machine comprising a mold squeezing mechanism including a vertically reciprocable squeezing member; and a carrier for a mold flask and pattern mounted for rotation about a horizontal axis to roll a flask and pattern over to and from opposed, cooperative rotation to said squeezing member, the carrier forming an upper pressure resisting head to receive the squeeze thrust.

18. A molding machine, comprising a mold squeezing mechanism including a squeeze member reciprocable up and down; a carrier for a mold flask and pattern mounted for rotation to roll the flask and pattern over to and from opposed, cooperative relation to said squeeze member, the carrier forming an upper pressure receiving head for squeezing; and means to releasably lock the carrier for resisting the squeeze thrust.

19. A molding machine comprising a mold squeezing mechanism including a squeeze member reciprocable up and down; a carrier for a mold flask and pattern mounted for rotation to roll over the flask and pattern to and from opposed cooperative relation to said mold-squeezing member the carrier forming an upper pressure receiving head for the squeezing action; means holding the pattern to the carrier; and releasable means holding the flask to the pattern, said latter means being releasable by the mold compression to permit the flask to recede downward with the reciprocable mold squeezing member to draw the mold from the pattern.

20. A molding machine comprising a fluid pressure operated mold squeezing mechanism; a fluid pressure operated carrier for a mold flask and pattern mounted for shifting the flask and pattern to and from cooperative relation with the mold squeezing mechanism; valve means to control the operation of the squeezing mechanism and the shifting of the carrier and including a handle shiftable in one plane for controlling the operation of the squeezing mechanism and shiftable in a plane at a right angle to the first plane for controlling the carrier shift.

21. A molding machine comprising a mold squeezing means; fluid pressure mechanism for operating said squeezing means; a carrier for a mold flask and pattern mounted for shifting the flask and pattern to and from cooperative relation; a fluid pressure mechanism for shifting the carrier; a rotary valve for controlling one of said fluid pressure mechanisms; a reciprocable valve for controlling the other fluid pressure mechanism; a handle shiftable in one plane for operating the rotary valve and shiftable in a plane at a right angle to the first plane for operating the reciprocable valve; and guard means to prevent a carrier shifting operation of the valve handle during a mold squeezing operation.

22. A molding machine comprising a mold-forming mechanism; a carrier for a mold flask and pattern mounted for rotation about a horizontal axis to shift the flask and pattern to and from cooperative relation to said mold-forming mechanism; a fluid pressure operated mechanism for rotating the carrier comprising a cylinder, a piston in said cylinder, fluid connections leading to the cylinder to cause the piston to reciprocate, and an operative connection between the piston and the carrier; and by-pass means to conduct fluid around said piston from one point in the cylinder to another for yieldably resisting movement of the piston and cushioning descent of the carrier and its load.

In testimony whereof I hereunto affix my signature.

WILLIAM H. NICHOLLS.